H. KAGEYAMA.
ELECTRICAL DIRECTION INDICATOR.
APPLICATION FILED SEPT. 30, 1914.

1,304,573.

Patented May 27, 1919.
3 SHEETS—SHEET 1.

Witnesses:

Inventor:
Hosaku Kageyama.

H. KAGEYAMA.
ELECTRICAL DIRECTION INDICATOR.
APPLICATION FILED SEPT. 30, 1914.

1,304,573.

Patented May 27, 1919.
3 SHEETS—SHEET 2.

H. KAGEYAMA.
ELECTRICAL DIRECTION INDICATOR.
APPLICATION FILED SEPT. 30, 1914.

1,304,573.

Patented May 27, 1919.
3 SHEETS—SHEET 3.

Witnesses:

Inventor:
Hosaku Kageyama

UNITED STATES PATENT OFFICE.

HOSAKU KAGEYAMA, OF LOS ANGELES, CALIFORNIA.

ELECTRICAL DIRECTION-INDICATOR.

1,304,573.      Specification of Letters Patent.      Patented May 27, 1919.

Application filed September 30, 1914. Serial No. 864,302.

*To all whom it may concern:*

Be it known that I, HOSAKU KAGEYAMA, a subject of the Emperor of Japan, residing at Los Angeles, county of Los Angeles, and State of California, have invented a new and useful Electrical Direction-Indicator, of which the following is a specification.

This invention relates to an electrical direction indicator which is especially adapted for use on automobiles to indicate the direction in which the automobile is about to turn, or indicate that the automobile is about to stop or slow up and while especially adapted for this purpose, it may be employed in any situation where information may be given by means of an indicator.

The object of the invention is to provide an electrical device of this character which is of comparatively simple construction, effective in operation, and of economical manufacture.

Referring to the drawings:

Fig. 6 is a diagrammatic view of the signal showing the indicator in the normal position.

The invention embodies a signaling device adapted to be placed on one or more points in any convenient position on an automobile or any other vehicle, and which is controlled by a switch means located convenient to the operator.

The electric operation of the signal proper in this invention is the application and adaptation of the well known fundamental principle that two magnetic poles which are the same in polarity repel each other and two magnetic poles opposite in polarity attract, and a magnetic needle free to turn, and placed in a magnetic field will take a definite direction.

The said part of the electric operation of this signal device essentially consists of two parts, viz., the field magnet and the armature. The duty of the field magnet is to set up the magnetic field in various directions and the armature which is used either in pairs or singly according to whether one or two indicating devices are employed, can either be a permanent magnet or a magnet produced by electric current, and this armature, being free to turn on its axis, may be directed to take various directions under the influence of the field and this motion is directly communicated to the indicating device.

The armature having a magnetic polarity, unlike mere soft iron armatures heretofore used for similar purposes, has not only an attraction toward the field magnet, but a selective power as to which way to turn, in case the direction of the magnetic field is changed or reversed.

In the form shown in Figs. 1 to 14 inclusive, the signal comprises plate members which are adapted to be moved into various relative positions by means of a pair of armatures with which they are respectively connected, the said armatures being independently moved with respect to each other and being operated by field coils.

Figure 1:
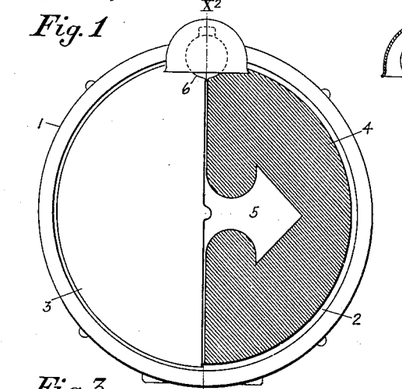
Figure 1 is a front elevation of one form of the signal.

These instrumentalities are mounted inside of a case 1, having a circular transparent front 2, through which the indicating plates are visible, there being in the present embodiment an outer, white, semicircular plate 3, and an inner plate 4, the plate 4 being half white and the other half of distinguishing color, provided with an indicator such as the arrow 5 as shown in Fig. 1. The purpose of the outer semicircular plate is to conceal the distinguishing color of the inner plate, and thereby show a blank surface as in Fig. 6 when the signal is restored to normal position thus adding conspicuousness to the signal when the distinguishing color appears. The idea of this signal is to show the direction by the contrast of two distinctive shades which divide the signaling surface about equally, and the distinguishing color always appearing in the direction in which the automobile is about to turn. By this arrangement of these two plates, four signal positions are possible besides that of normal; these are, (a) the distinguishing color, right Fig. 7; (b) the distinguishing color left Fig. 8; (c) the distinguishing color at bottom, Fig. 9, which can be used to indicate that the automobile is about to stop; and (d) the distinguishing color at the top, Fig. 10, which may be used to indicate that the automobile is about to slow down. As these four positions of the distinguishing color are those of the inner circular plate itself, this circular plate can be used as a signal, in which case, one of four positions, for example the distinguishing color at the top, has to be assumed to indicate the normal position. However, the use of an outer plate concealing and exposing the distinguishing color increases not only the usefulness but effectiveness of the signal. To uncover the distinguishing color, the outer plate has always to make an angular displacement of 180 degrees relative to the inner one and it will be seen from the character of the operating part of this machine that this can be easily accomplished.

The outer rim of plate 3 is carried by a frame 7 which is rigidly mounted on a sleeve 8 journaled in a frame 10. The plate 4 is mounted on a shaft 9 which extends through sleeve 8 and is journaled to the rear in the frame 11, and at the front is supported in the sleeve 8. The sleeve 8 is loose on the shaft 9 and carries an armature 12 and a sleeve 8ª fixed on the shaft 9 carries an armature 13.

Surrounding the armatures are four field coils 17, 18, 19 and 20 mounted on the same continuous core and this field core is connected to the case 1 by bracket 21. Between the field coils, four field poles 22, 23, 24 and 25 project from the core and are placed 90 degrees apart and the pole tips are cut in an exact shape of a circular arc and of the same dimensions and these four pole tips together occupy about one half of the whole circumference, the rest being left as air space to prevent magnetic leakage directly from pole to pole.

A pair of field coils which are mounted on the core diametrically opposite as coils 17 and 19 are so connected electrically that when electric current is sent through these coils, magnetic lines of force which are produced in the core by the respective coils are in the directions opposite to each other. Similarly another pair of coils 18 and 20 are so connected that magnetic lines of force are produced in the opposite directions, and through each pair of coils current may be sent in one direction or the other. By the combination of these two pairs of coils which are simultaneously energized, magnetic lines of force can be produced in four ways, as shown in Figs. 11, 12, 13 and 14, by arrows, and in each case the resultant poles are produced on the pair of pole pieces situated diametrically opposite, that is to say, poles 22 and 24, or poles 23 and 25, thus offering the field to the armatures and causing the same to assume a corresponding angular position, and these four positions in turn correspond to four positions of the indicating plates.

There are no idle coils in any of these operations, each one of four coils assisting the others to set up a strong field in the desired direction and thus enabling the operating part of this machine to be of rather small dimension for the diversity of duty it performs.

The armatures 12 and 13 are each provided with coils 14. One end of the wire of coil of the armature 12 is connected to the sleeve 8 and the other end of the wire is connected to a journal at the front which is in contact with the frame 10, but insulated from the sleeve 8, and the frame 10 is insulated from the body of the field magnet to which it is attached. Similarly one end of the wire of the coil of the armature 13 is connected to the shaft 9 which is in contact with the sleeve 8 and the other end of the wire is connected to a journal at the rear which is in contact with the frame 11 but insulated from the shaft 9, and the frame 11 is insulated from the body of the field magnet to which it is attached. Thus current can be sent from the supporting frame through the coils of the moving armature, and journals, and sleeve, and shaft, the sleeve and journals serving as slip rings, thus energizing the armatures.

Figures 3, 4, 5, 7, 8, 9, 10, 11, 12, 13, 14:
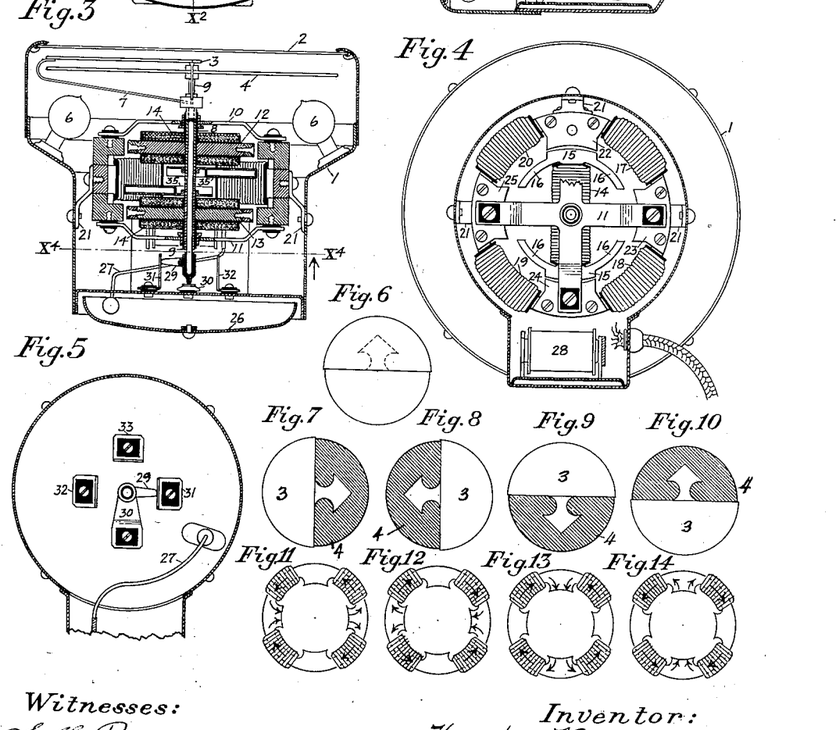
Fig. 3 is a horizontal section on line $X^3$—$X^3$ of Fig. 2.
Fig. 4 is a section on line $X^4$—$X^4$ of Fig. 3 which is in the direction of the arrow.
Fig. 5 is a section on line $X^4$—$X^4$ of Fig. 3, looking in a direction opposite to arrow.
Fig. 7 is a signal view showing the indicator in the relative angular position.
Fig. 8 is a similar view showing the indicator in another angle.
Fig. 9 is a similar view showing the indicator in another angle.
Fig. 10 is a similar view showing the indicator in still another angle.
Fig. 11 is a diagrammatic view of the field magnet showing the direction of magnetic lines of force produced by the coils, corresponding to the position of the signal in Fig. 7.
Fig. 12 is a view of the field magnet showing the direction of magnetic lines of force corresponding to the position of the signal in Fig. 8.
Fig. 13 is a view of the field magnet showing the direction of magnetic lines of force corresponding to the position of the signal in Fig. 9.
Fig. 14 is a view of the field magnet showing the direction of magnetic lines of force corresponding to the position of the signal in Fig. 10.

Fig. 4 shows the armatures in their normal position. The coil of the armature 12 and the coil of the armature 13 are so connected that if the current is sent through these coils in this normal position, lines of magnetic force produced in their respective cores are in opposite directions, that is to say, north pole upward in one armature and north pole downward in the other, and if these armatures are made to take their respective positions under the influence of the field magnet their angular displacement and that of the indicating plates to which the armatures are respectively connected will always be 180 degrees, resulting in uncovering of the distinguishing color of the inner plate.

To steady the armature to the exact position intended, the pole pieces 15 of the armature are cut in an exact dimension to fit to that of the field magnet, and only a narrow air gap being left between two to allow a free movement to the armature. The curvature of the pole tip of the armature is made slightly flatter than that of the field magnet as shown in Fig. 4. This has the effect of concentrating the magnetic lines of force which may pass betwen the poles of both the field and the armature to both ends of the pole tip rather than the middle part so that the slight angular displacement of the pole tips causes a large change of magnetic lines of force, and the tendency of a magnet to pass the largest possible number of lines of force through its circuit resists such displacement, thereby steadying the armature.

Slightly back of the pole tips of the armature hornlike arms 16 extend circumferentially, the purpose of which are to fill the air spaces left by the pole pieces of the field magnet, and thereby bring the poles of the armature nearer to those field poles which are located at right angles to the armature. This has the effect of diverting magnetic lines of force of the armature toward the direction of circumference through these arms and thereby opening attraction to those field poles which are located at right angles to the armature, that is to say, the poles 23 and 25 in Fig. 4, when the field appeared on such poles, and also reducing the tendency of the armature of exerting attraction on those poles under which the armature was placed, that is to say, the poles 22 and 24 in Fig. 4 when no field appeared on such poles.

Figure 2:
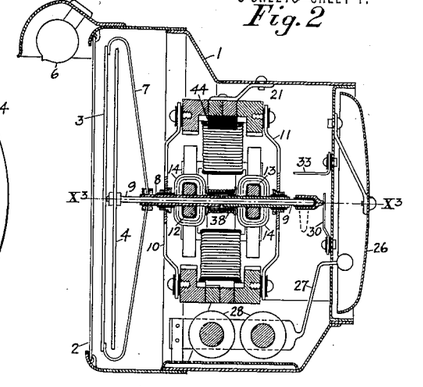
Fig. 2 is a vertical section on line $X^2$—$X^2$ of Fig. 1.
Figures 34, 35:
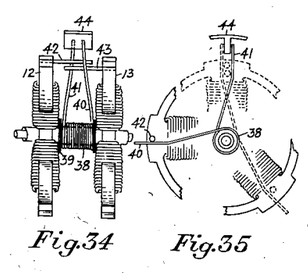
Fig. 34 is a side elevation in detail of the signal restoring spring.
Fig. 35 is a front elevation of what is shown in Fig. 34.

The devices for restoring the armature and thereby the signal to its normal position are of two kinds, one by a movable weight, the other by a restoring spring. The weight 35 in Fig. 3 shows the former in position and the spring 38 in Fig. 2 shows the latter. Figs. 30 to 33, both inclusive show the former device in detail and Figs. 34 and 35 show the latter device.

Referring to Figs. 30 to 33 inclusive, a movable weight 34 is placed in a light heart-shaped hollow cam 35, the outline of which consists of a number of smooth curves of varying curvature, along which the movable weight 34 can glide or roll. This cam is rigidly attached to the axis of the armature which is the sleeve 8ª or sleeve 8 which passes through the hole 36 of the cam.

Figure 30:
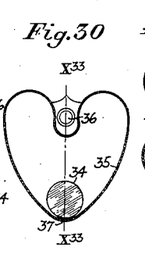
Fig. 30 is a sectional elevation of a form of signal restoring device in which a movable weight is employed showing the parts in the normal position.

Fig. 30 shows the cam and the movable weight in their normal position.

Figure 31:
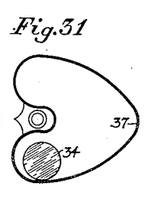
Fig. 31 is a view to Fig. 30 showing the position of parts at one angle of 90 degrees.

Fig. 31 shows the relative position of the cam and the movable weight when the signal takes the position of right or left.

Figures 32, 33:
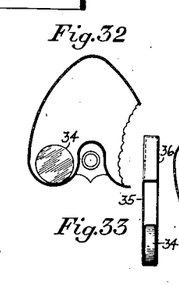
Fig. 32 is a view to Fig. 30 showing the position of parts at another angle.
Fig. 33 is a section on line $X^{33}$—$X^{33}$ of Fig. 30.

Fig. 32 shows the cam and the weight in one of the other changes of position.

The curved outline of this hollow cam is such that at the point 37 where in Fig. 30 the weight 34 rests, it is somewhat pointed and this point is situated farthest from the center of rotation 36 of the cam, and passing on both sides from this point the walls curve gradually and converge toward the center of rotation. The tendency of the movable weight to take the lowest possible situation may cause the weight to take such position as shown in Figs. 31 and 32 if the cam was turned and held in these positions by the action of the armature, but the same tendency of the movable weight to take the lowest possible position will restore both the weight and the cam to the position of the greatest stability as shown in Fig. 30, as soon as the outside force ceases.

Using a movable weight the weight 34 in Fig. 31 which rests directly below the rotating axis, exerts little turning force, while the slight weight of the hollow cam which is made of thin light material is just sufficient to start the signal to return to the original position. In Fig. 32 while the cam has no restoring power the movable weight 34 rests in the recess at one side of the rotating axis and exerts returning force which is, however, not sufficient to deviate the signal while the magnetism is in action. When restored to normal position of Fig. 30 the weight 34 is held in the pointed recess 37 and acts as a weight fixed at this point, which being located farthest from the center of rotation is most advantageous in steadying the signal to the exact position.

The moving parts of this signal are balanced or they can be made to balance except this movable weight and it is therefore mainly against this restoring force that the power has to be expended to operate this signal and by using the movable weight the center of gravity of the weight has to be raised only about one half as much as where the weight is fixed and this results in considerably lessening the power required for operation.

The cam may be of any construction and the outline contour of the same may be varied and instead of a solid rolling weight a heavy fluid substance such as mercury may be used as the movable weight.

Referring to Figs. 34 and 35, a restoring spring device comprises a coil spring 38 which is wound around a tubular bobbin 39 which fits on both the sleeves 8 and 8ª of the armatures and the ends 40 and 41 of the spring engage on opposite sides of pins 42 and 43 which are mounted on the respective poles of the armatures 12 and 13, and also a stationary lug 44 which is secured to the field magnet core so that when in normal position the ends of the spring bear on opposite sides of the stationary lug 44 and hold the respective pins 42 and 43 and their associated armatures in proper normal position and yet permit either or both magnets to be rotated in either direction when the latter is in action, the spring serving to automatically restore the magnets to their normal position when the coils are deënergized.

The restoring power of the spring is uniform at any point of rotation and its strength can be adjusted not to deviate armatures from their signal positions and it can hold the signal at the exact normal position against such an agency as the vibration of a running vehicle, and it can be used for a single armature as well as for a pair and particularly in case of the vertical shaft where the restoring weight can not be applicable.

To attract the attention of those around the vehicle which is about to turn or stop and cause them to look at the indicator an electric bell 26 is provided and a hammer 27 for striking the bell is operated by a magnet 28.

This bell is not operated directly through the transmission wires by the operator, but it is automatically rung through the movement of the signal itself.

To effect electrical connection to the coils of the electric bell the rear end of the shaft 9 carries a blade 29 which is insulated from the shaft 9 but in contact with a contact piece 30 and is adapted to make connection with the stationary contacts 31, 32 or 33. The contacts 31, 32 and 33 are connected to the ends of the transmission wires and the contact piece 30 is connected to the coils of the electric bell.

When the signal is operated the movement of the shaft brings the blade 29 into contact with either of the stationary contacts 31, 32 or 33 thereby closing the circuit to the electric bell and thus the bell is automatically rung.

If for any reason the signal fails to respond to the operator's hand, the failure of the bell to ring will be a warning to him that the signal is not performing its duty, and the sound of the bell is an assurance to him that the signal is working and appeared, and this precautionary device will be of no small importance to safety when the signal is located out of sight of the operator.

To illuminate the signal in the night, one or more lamps 6 may be carried by the case 1 either outside as shown in Figs. 1 and 2, or inside as shown in Fig. 3 in the latter case, the indicating plates being made of a transparent material.

Figures 15, 16, 17, 18, 19, 20, 21, 22, 23, 24:
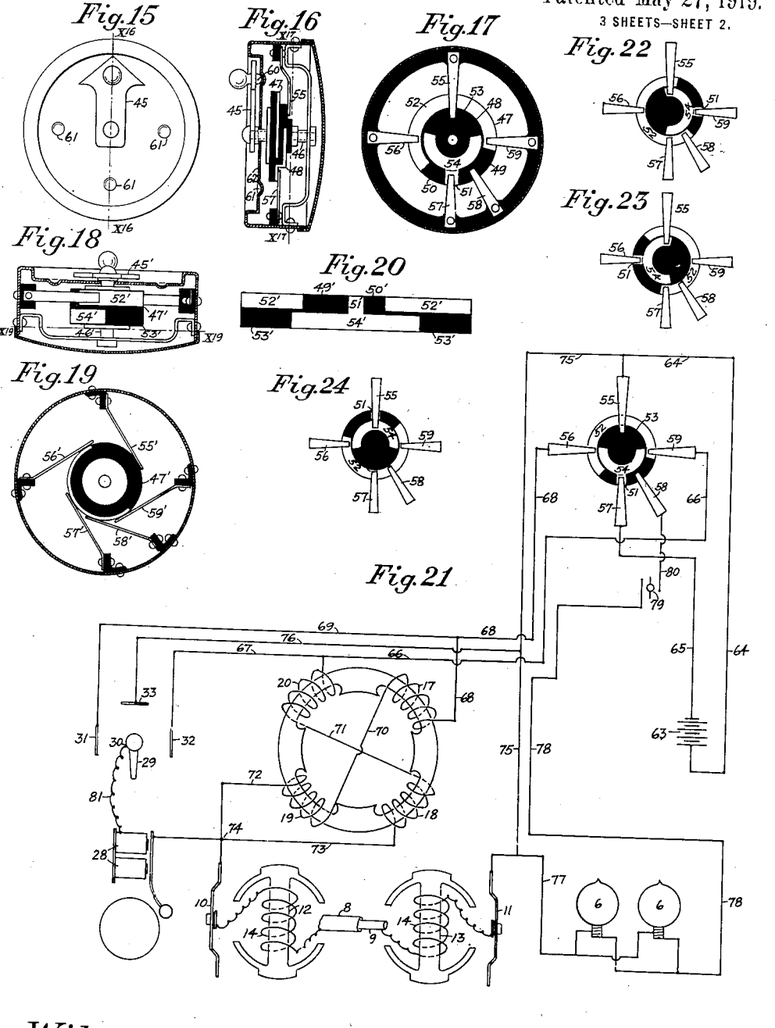
Fig. 15 is a front view of the manually operated switch.
Fig. 16 is a section on line $X^{16}$—$X^{16}$ of Fig. 15.
Fig. 17 is a section on line $X^{17}$—$X^{17}$ of Fig. 16.
Fig. 18 is a horizontal section through a modified form of switch.
Fig. 19 is a section on line $X^{19}$—$X^{19}$ of Fig. 18.
Fig. 20 is a view showing the development of the barrel switch of Fig. 18.
Fig. 21 is a diagram of the electrical connection.
Fig. 22 is a diagrammatic view of the switch showing the contacts in relative angular position.
Fig. 23 is a view of the switch in another angle.
Fig. 24 is a view of the switch in still another angle.

The switch used for controlling the signal may be of various forms. In the present embodiment, one form of switch comprises a hand operated crank 45, rigidly mounted on shaft 46, the shaft 46 carrying disks 47 and 48, the faces of which, as shown in Fig. 16 are in different planes. Disk 47 is provided with insulating segment 49, an insulating segment 50, and a contact segment 52. The disk 48 has an insulating segment 53 and a contact segment 54 and contact segment 51 is electrically connected to contact segment 54. A contact finger 55 rests against the face of the disk 48 and contact fingers 56, 57, 58 and 59 rest against the disk 47.

The crank 45 is provided with a projection 60 on its under side which is adapted to yieldingly engage in depressions 61 on the spring plate 62, below the crank and to thereby enable the crank 45 to be easily placed in corresponding angular register for the proper positioning for the switch disks.

A modification of the switch is indicated in Figs. 18 to 20 inclusive wherein a barrel 47' is employed in place of the disks 47 and 48. The contact segments 51', 52' and 54' and the insulating segments 49', 50' and 53' as shown in development in Fig. 20, are arranged on the cylindrical surface of the barrel 47', their angular proportion being similar to those on the disks 47 and 48, and contact fingers 55', 56', 57', 58' and 59' in their respective angular positions around the barrel are adapted to sweep on the contact segments and the insulating segments, when the barrel 47' is operated by the crank 45' to give the same circuit connections as in the previous form.

Fig. 21 shows the electric connections in which 63 designates the source of electric current, one pole of which is connected by wire 64, with contact finger 55 and the other pole is connected by wire 65 with contact finger 57. Wire 66 leads from contact finger 59 to field coil 20 and a branch wire 67 leads to bell contact 32. A wire 68 leads from contact fingers 56 to field coil 17 and a branch wire 69 leads from wire 68 to bell contact 31. A wire 70 leads from field coil 17 to the opposite field coil 19 and a wire 71 leads from field coil 20 to the opposite field coil 18. A wire 72 which leads from field coil 19 is connected to a wire 73 which leads from field coil 18 at 74. A wire 75 which is connected to wire 64 at contact finger 55 leads to the rear frame 11, thence through the journal, to the coil 14 of the armature 13, thence through the sleeve 8ª, the shaft 9 and the sleeve 8 to the coil 14 of the armature 12 and thence through the front frame 10 and its journal, and connects with the common connection 74. A branch wire 76 leads from wire 75 to bell contact 33.

A wire 77 leads from wire 75 to lamps 6. A wire 78 leads from lamps 6 to lamp switch 79 and a wire 80 leads from lamp switch 79 to the contact finger 58. A wire 81 leads from contact piece 30 which is in contact with contact blade 29 of bell, to the coils 28 of the bell and thence to the common connection 74.

When the switch is arranged in normal position as indicated in Fig. 21, with the contact finger 55 over the insulating segment 53, there is no current flowing and the parts of the signal are held in normal position by the restoring device, at which time the colored portion of plate 4 is hidden behind the plate 3 and the light half portion of plate 4 is visible, which together with plate 3 presents a completely white plate to the view.

The operation is as follows: If it be desired to signal that the driver is about to turn to the right, so that the signal will indicate as shown in Fig. 7, the operator will turn the switch handle 45 so that it engages in the right hand notch 61 of Fig. 15. This will place contact disks in the position shown in Fig. 22 and will produce circuits about to be described in such a manner as to energize the field coils and produce lines of force as indicated in Fig. 11, the circuits being established as follows: Referring to Fig. 21 and Fig. 22, from battery 63 through wire 64 to contact 55, to switch segment 54 and through segmental plate 51, to contact 59, to wire 66, to field coil 20 through wire 71 to field coil 18, to wire 73, to common connection 74 and thence to wire 72, to field coil 19, through wire 70 to field coil 17, to wire 68, to contact 56, to switch segment 52, to contact 57, and wire 65 back to battery 63, and also from wire 75 to coils 14 of armatures 13 and 12, to common connection 74, thus joining to the previous circuit. This circuit energizes the field coils 17, 18, 19 and 20 in a direction to produce the lines of force indicated by the arrows in Fig. 11, establishing the north pole at the left and the south pole at the right and at the same time energizes the coils of armatures 12 and 13 to produce lines of force in opposite directions establishing the south pole at the top and the north pole at the bottom on the armature 12, and the north pole at the top and the south pole at the bottom on the armature 13, and acting to turn the two armatures in opposite directions and causing the plate 3 which is associated with armature 12 to be moved to the left, as shown in Fig. 7 and causing the plate 4, which is associated with the armature 13 to be moved to the right into the position shown in Fig. 7 in such a manner that the distinguishing color with the arrow 5 is exposed and indicates that the driver is about to turn to the right. In this operation each of the plates has been turned through 90 degrees in opposite directions so that they both stand 180 degrees apart from each other, and so long as the switch arm 31 is in the position set, current will continue to flow and maintain the indicator in this position. As soon as the switch arm is returned to normal position indicated in Fig. 15 the switch is restored to the normal position shown in Fig. 17, thereby breaking the circuits and deënergizing the various coils and allowing the restoring weights or spring to turn their respective armatures back to normal position, so that the indicator again presents the appearance of a plain plate.

When the driver desires to indicate that he is to turn to the left, he turns the switch arm 45 so that it engages the left hand depression 61, thereby placing the switch in the position shown in Fig. 23, thus establishing circuits about to be described, which produce lines of force indicated by the arrows in Fig. 12. These circuits are as follows: Referring to Figs. 21 and 23, from battery 63 through wire 64 to contact 55, to switch segment 54, to contact 56, to wire 68, to field coil 17, to wire 70, to coil 19, to wire 72, and to common connection 74, and thence to wire 73, to field coil 18, through wire 71 to field coil 20, to wire 66 to contact 59, to switch segment 52, to contact 57, through wire 65 to battery 63; also from wire 75 through the armature coils to common connection 74 as in case of the right and thence over the circuit before described, which energizes the field coils in the directions opposite to that given in the preceding case, and as shown in Fig. 12, causes the north pole to be at the right and the south pole at the left, while the direction of magnetic lines of force in the armatures remaining the same as in the preceding case thereby actuating the respective indicating plates in exactly the opposite directions to that in the preceding case, and causing the indicating hand 5 to point toward the left.

If the operator desires to indicate that he is coming to a stop, he turns the switch lever 45 into engagement with the lower depression 61, thereby placing the switch in the position shown in Fig. 24, which establishes connections causing energization of the coils to produce lines of force as indicated by the arrows in Fig. 13, establishing the north pole at the top and south pole at the bottom. The circuits are as follows: Referring to Figs. 21 and 24, from battery 63 through wire 64 to contact 55, but current does not pass through contact 55 because no other contact touches the contact segment 51 and the circuit continues from wire 64, to wire 75 and thence through the coils of the armatures as in the preceding two cases, to common connection 74, thence branching to two directions and one of which circuits is from the connection 74, through wire 72 to coil 19, through wire 70 to coil 17, to wire 68, to contact 56, to segment 52, to contact 57, and wire 65 to battery 63, and another branch of circuit is from the connection 74 through wire 73 to coil 18 through wire 71 to coil 20, to wire 66 to contact 59, to segment 52, contact 57, wire 65, and battery 63, this energization of the coils producing the lines of force on the field magnet shown in Fig. 13, and on the armatures in the same directions as in the preceding two cases, and armature 13 operating through shaft 9 turns plate 4 so that the indicator 5 stands at the bottom and armature 12, through sleeve 8 holds plate 3 to stand at the top.

While the foregoing three operations are those for which the signal is primarily intended, the construction is such that it is capable of giving a fourth indication. This fourth indication, for example, could be utilized to signal that the driver was about to slow down. To accomplish this, the connections are made to produce the lines of force as indicated in Fig. 14, which are simply the reverse of those shown in Fig. 13.

In each of the foregoing circuits, if it is desired to have the lamps 6 illuminated, which would be desirable at night, the button 79 may be closed, and when either of the foregoing circuits were established, a branch circuit would be formed from wire 75 through wire 77 to lamp 6, through wire 78 to switch 79, wire 80, contact 58, switch segment 52, contact 57, and wire 65, to battery 63.

As the shaft 9 is operated, into either of the before described positions, the contact 29 carried thereby is moved into electrical connection with either contact 31, 32 or 33, which forms a shunt circuit around either pair of coils 17 and 19, 18 and 20, or coils of the armatures from either wire 69, wire 67, or wire 76 respectively through wire 81 and bell 28, to common connection 74 so that whenever the indicator is operated, the bell is automatically rung, which attracts the attention of those around the vehicle, which is about to turn or stop, and causes them to look at the indicator.

In actual practice the coils of the field magnet and armatures are wound with an equal number of turns and their electrical resistance is made substantially equal. From the foregoing descriptions of circuits it will be seen that in case of indicating right the armatures receive only about one-half of the full current, which goes through the coils 17 and 19, and in case of indicating left the armatures receive only about one-half of the full current which goes through the coils 18 and 20, while in case of stop the coils 17 and 19 and the coils 18 and 20 equally divide the full current which goes through the armatures. As a result the armatures are less magnetized in case of right or left while in case of stop their magnetization equals that of the field magnet. The bell circuit is not closed until the signals are in signaling position and thus does not interfere with the mode of operation above described. In case of indicating right or left the turning force is in the sidewise directions, that is to say, the attractive pole at one side and the repulsive pole at the other and all required of the armatures is the power to select between these two. While in case of a stop the turning force of the field acts on the armature 13 which has to turn 180 degrees, in the directly opposing direction and in this case the operation depends upon the repulsion between the poles of the field and armature. To avoid the tendency of either the field or the armature overcomes the other and exerts an attraction instead of repulsion in this case, it was found desirable to make the magneto-motive force or ampere turns of both the field and the armature about equal and this was accomplished in the way just stated. While the armature 13 at this position is placed at a dead point and therefore theoretically has little turning tendency, it is at a very unstable position as the arms extending from the armature poles always tend to send magnetic lines of force either one side or the other and slightest inaccuracy in symmetry, in construction or in position was found to start the armature either one side or the other without fail. The construction of the switch is such that in order to come to the position of stop it has to pass the position of either right or left. This sends the armature instantly either right or left, and thereafter the commutation of electric contacts is done continuously, always sending current in a direction which tends to bring the armature to the position of stop, and it was found in practice that the signal closely follows the movement of the switch handle.

In the foregoing statement it was shown that there are three pairs of coils in this wiring arrangement in which each one of these three pairs receives the full current of the signal in each of corresponding operations. The potential difference between the ends of that pair of coils which receives the full current is about twice larger than that of the rest of the circuits. It is on this stage of circuit of large potential difference that the connection to the electric bell is established through its contacts, in each of corresponding operation, and the coils of the bell or the spring of its hammer may be so adjusted that while the bell can be operated under this large potential difference, the potential difference on the rest of stage of circuit is not sufficient to start the hammer. Under such arrangement, though the contact blade 29 may touch the contact 31 or 32 on its way to the position of stop or by any reason it may come into contact with any other contact than that which correspond to the intended position of signal and the current may flow through the coils of the bell, the current in this case is not sufficient to start the bell, with the effect that there is only one position for the blade in each of the operations in which it can start the bell and that one position is when the signal direction coincides with that of the switch handle.

Figure 25:
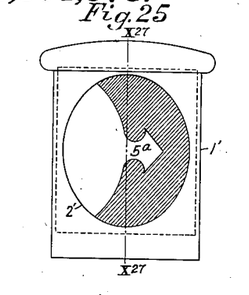
Fig. 25 is a front elevation of a modified form of signal in which a cylinder with a vertical axis is employed.
Figure 26:
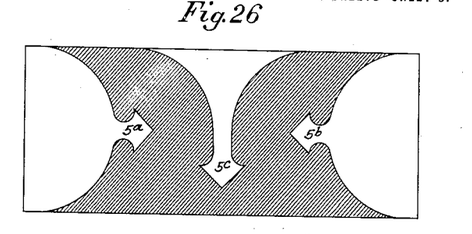
Fig. 26 is a development of the barrel of the signal of Fig. 25.
Figure 27:
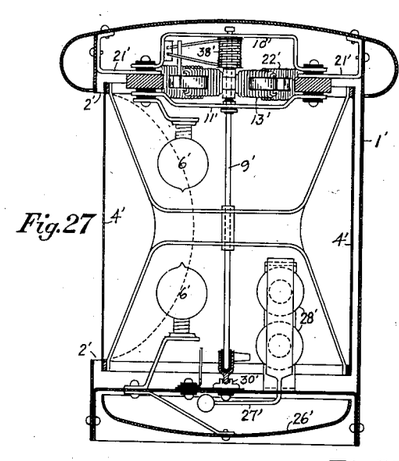
Fig. 27 is a vertical section on an enlarged scale on line $X^{27}$—$X^{27}$ of Fig. 25.

Figs. 25 to 27 inclusive, show an alternative construction in which the indicating device is in the form of a drum 4' which is mounted on a shaft 9', the latter having a single armature 13' which is operated by the four field coils mounted on the core 22' and the latter in turn being secured to the case 1' by the bracket 21'. The shaft 9' is journaled at the top in the frame 10' and 11' and supported on a contact 30' at the bottom.

The drum 4' is provided on its cylindrical surface with an indicating design as clearly shown in the development in Fig. 26 and an outer tubular casing 1' is provided with either a circular or oval sight opening 2' through which the indicating color may be seen as shown in Fig. 25. In the normal position the plain surface shown in Fig. 26 at both sides of the development is exposed. In case of either right or left the distinguishing color, with the arrow indicator 5$^a$ or 5$^b$ appears in the respective direction as shown in Fig. 25. In case of stop the distinguishing color appears at both sides, with an arrow indicator 5$^c$ at the center.

By this arrangement of color it is possible to expose considerably more than 90 degrees of the cylindrical signal surface, while angular positions of the signal is 90 degrees apart.

In this form, only a single shaft is used and only a single armature is employed and the spring device is used exclusively to restore the signal to normal position as the restoring weight is not applicable in this case of the vertical shaft, otherwise the operation of this form of signal is exactly the same as in the preceding case.

If desired the barrel 4' may be transparent, and the lamps 6' which are located within the barrel will shine through the barrel, making it plainly visible at night. The electric bell 26' is located in the base of the casing 1' with its hammer 27' and the magnet 28' and is operated in the same way as described before.

Figure 28:
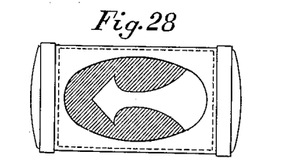
Fig. 28 is a front elevation of another form of signal in which a barrel having a horizontal axis is employed.
Figure 29:
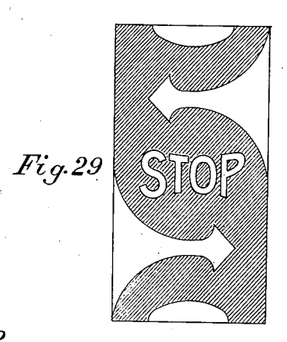
Fig. 29 is a development of the horizontal barrel used in Fig. 28.

If desired, the horizontal tubular construction shown in Figs. 28 and 29 may be employed, the internal mechanism being the same as shown in Fig. 27.

While I have shown several modifications of my invention, it should be understood that I do not limit myself to the specific construction shown.

What I claim is:

1. An electric signal comprising indicating means consisting of two plates capable of independent revolution, two separate revoluble magnets for operating the respective plates, and a field magnet with coils capable of attracting both revoluble magnets to various angles.

2. An electric signal comprising indicating means consisting of two plates capable of independent revolution, two separate revoluble magnets for operating the respective plates, coils on the respective magnets, a field magnet with coils capable of attracting both revoluble magnets to various angles, and switch means for controlling the energization of said field coils and magnet coils.

3. A signal comprising two plates, one of which has a semicircular display face, the other of which is a complete circular disk having its face divided into semicircular areas of contrasting colors, and means for moving said plates into various angular positions.

4. An electric signal comprising two indicating devices, a tubular shaft carrying one device, a shaft extending through the tubular shaft carrying the other device, magnets carried by the respective shafts, and field coils for attracting said magnets to operate said indicating devices.

5. An electric signal comprising an indicating device, a revoluble magnet connected to said indicating device through a shaft, field coils for attracting said magnet, to move said indicating devices into various angular positions, a contact arm carried by said shaft, a series of stationary contacts with which said arm is adapted to connect when said shaft is in any one of the indicating positions, and an electric means connected through the contact arm with the respective stationary contacts for producing an audible signal coinciding with the visual signal.

6. A signal comprising indicating means consisting of two plates capable of independent revolution, one of said plates being adapted to expose or conceal various portions of the other plate when moved into different relative angles, and means for operating said plates independently of each other to various angular stationary positions to produce different signals.

7. An electric signal comprising a plurality of revoluble indicating members, a plurality of revoluble armatures for operating said members, and a field magnet device forming a magnetically interrelated unit for attracting said armatures to various angles.

8. An electric signal comprising a plurality of rotatable indicating members, a plurality of revoluble magnets for operating said indicating members, coils on said magnets, a field magnet device having one or more coils for attracting said magnets to various angles, and switch means for controlling the energization of said field coils and magnet coils.

9. An electric signal comprising a revoluble indicating member, a revoluble magnet with coils for operating said member, a field magnet device provided with diametrically disposed pairs of projecting poles for attracting the revoluble magnet to various angles, a series of field magnet cores, said cores and said poles being alternately connected with each other, field coils on the respective cores adapted to collectively energize any selected one of said pairs of magnet poles and switch means for controlling the energization of said field coils and magnet coils.

10. An electric signal comprising revoluble indicating means, one or more revoluble armatures for operating said indicating means, a field magnet device having poles circularly disposed and their projecting pole tips adapted to guide magnetic lines of force for said one or more armatures, and field coils for energizing said field poles, being wound on cores joined together by said field poles.

11. In an electric signal, revoluble indicating means, a motor device therefor comprising a field magnet having projecting poles disposed around the rotating axis of the motor and one or more revoluble armatures each having a diametrically opposite pair of poles adapted to be attracted by said field poles, and each of said armature poles having its pole face extended in an arcuate form divided into three parts, of which two lateral parts, each made of a convexed continuous arc, are offset back from the remaining middle part causing the latter to form a projection of substantially same width as the individual field pole.

12. In an electric signal, indicating means, a field magnet device provided with coils, and a plurality of independently revoluble armatures united with each other so as to be attracted through the energization of the same coils of said field magnet device for operating said indicating means.

13. In an electric signal, indicating means a field magnet device provided with poles and a plurality of independently movable operating armatures united with each other so as to be attracted by the same poles of said field magnet device for operating said indicating means.

14. A signal comprising a plurality of indicating members, a plurality of shafts concentrically mounted on a revolving axis, and connected to the respective indicating members, armatures carried by the respective shafts, a field magnet device for attracting said armatures to move the indicating members into signaling positions.

15. An electric signal comprising a revoluble indicating means, electric means for operating said indicating means to give a visual signal, an electric audible signal for coöperating with the visual signal by sounding an alarm and at the same time indicating to the operator whether said indicating means is operated or not, an electric switch mechanically operable by the movement of said indicating means, included in the circuit of said audible signal for controlling the same, and a switch arm carried by and rotating with said indicating means for automatically operating said electric switch, whereby the said audible signal is operated when said indicating means and the associated switch arm are in their signal positions.

16. An electric signal comprising a plurality of concentrically revoluble indicating devices, electromagnetic means for moving said indicating devices into signal positions, switch means for controlling the energization of said electromagnetic means, and means whereby said indicating devices are automatically restored to their original positions when said electromagnetic means are deënergized.

17. A signal comprising two indicating plates capable of concentric rotation, one of said plates having a display sign, the other plate being adapted to conceal or expose the display sign of the first plate, said indicating sign being normally concealed and means for operating said plates to expose said display sign selectively at any one of various predetermined angular indicating positions.

18. A signal comprising a plurality of indicating plates mounted for concentric revolution, said indicating plates having their display faces adapted to combine with one another to produce within themselves different indications when said plates are moved into different angular relations with respect to each other, said display faces of the plates being arranged to be visible in the direction of the rotating axis of the plates and means for operating each of said indicating plates respectively into either of its indicating angular positions to indicate the desired signal combinedly.

19. A signal comprising a plurality of indicating devices mounted for concentric revolution, said indicating devices having their display faces adapted to combine in producing different indications, when arranged in different angular relations with respect to each other, and electrically controlled means for operating said indicating devices to change the mutual combination and to display the combined devices at one or the other of various angular indicating positions according to the signal indication desired.

20. A signal comprising a plurality of indicating devices mounted for concentric revolution, said indicating devices being adapted to produce different indications when combined into different angular relations with respect to each other, and means for operating said indicating devices into different combinations and to display the combined devices at various angular stationary positions to give different signals.

21. A signal comprising two indicating plates capable of independent movement, one of said plates having an indicating sign, the other plate being adapted to cover or expose the indicating sign of the first plate, said indicating sign being normally covered by said other plate and means for operating both plates independently of each other to change the relative positions of the plates and thereby to expose said indicating sign selectively at one side or the other of the covering plate, according to the signal indication desired.

In testimony whereof, I have hereunto set my hand at Los Angeles, California, this 23rd day of September, 1914.

HOSAKU KAGEYAMA.

In presence of—
LORA M. BOWERS,
ANNA F. SCHMIDTBAUER.